United States Patent
Trouba et al.

(10) Patent No.: US 12,018,426 B1
(45) Date of Patent: Jun. 25, 2024

(54) LINT CAPTURING ASSEMBLY

(71) Applicant: Make It Better LLC, Auburn Hills, MI (US)

(72) Inventors: John Robert Trouba, Auburn Hills, MI (US); Christopher James Flynn, Grosse Pointe Park, MI (US)

(73) Assignee: Make It Better LLC, Auburn Hills, MI (US)

( * ) Notice: Subject to any disclaimer, the term of this patent is extended or adjusted under 35 U.S.C. 154(b) by 58 days.

(21) Appl. No.: 17/867,999

(22) Filed: Jul. 19, 2022

Related U.S. Application Data

(60) Provisional application No. 63/223,612, filed on Jul. 20, 2021.

(51) Int. Cl.
*D06F 39/10* (2006.01)
*B01D 29/27* (2006.01)

(52) U.S. Cl.
CPC .............. *D06F 39/10* (2013.01); *B01D 29/27* (2013.01)

(58) Field of Classification Search
CPC ................................ D06F 39/10; B01D 29/27
See application file for complete search history.

(56) References Cited

U.S. PATENT DOCUMENTS

| | | | | |
|---|---|---|---|---|
| 3,638,799 A | * | 2/1972 | Serowiecki | B01D 29/27 210/462 |
| 3,762,562 A | * | 10/1973 | Okuniewski | F16L 37/084 210/460 |
| 3,762,565 A | * | 10/1973 | Okuniewski | F16L 37/0925 210/460 |
| 3,960,733 A | * | 6/1976 | Van Dieren | B01D 29/23 210/485 |
| 4,523,992 A | * | 6/1985 | Sackett | B01D 35/14 210/232 |
| 4,906,367 A | * | 3/1990 | Villagomez | B01D 29/27 68/18 F |
| 4,970,880 A | * | 11/1990 | Luger | D06F 39/10 68/208 |
| D407,870 S | * | 4/1999 | Pappas | D32/25 |

(Continued)

FOREIGN PATENT DOCUMENTS

KR 101450509 B1 * 10/2014

OTHER PUBLICATIONS

Electronic translation of KR-101450509-B1 to KIM. (Year: 2014).*

*Primary Examiner* — Joseph L. Perrin
(74) *Attorney, Agent, or Firm* — Buckert Patent & Trademark Law Firm PC; John F. Buckert

(57) ABSTRACT

A lint capturing assembly includes a bag holding member having a top portion, a bottom portion, an outer surface, and an inner surface. The inner surface defines a central open region. The assembly includes a fabric bag having a first end portion defining an open end. The first end portion is disposed through the central open region of the bag holding member. The first end portion is disposed against the top portion and the outer surface of the bag holding member. The assembly includes a cap member that is disposed against the first end portion of the fabric bag such that the first end portion is disposed between the cap member and the top portion of the bag holding member. The cap member has a central opening that communicates with the open end of the fabric bag. The assembly includes a first hook member that is coupled to the bag holding member.

10 Claims, 16 Drawing Sheets

(56) References Cited

U.S. PATENT DOCUMENTS

| | | | |
|---|---|---|---|
| 6,210,573 B1 * | 4/2001 | Marshall | B01D 29/27 210/462 |
| 6,253,585 B1 * | 7/2001 | Wright | D06F 39/10 68/18 F |
| 6,334,953 B1 * | 1/2002 | Singleton | B01D 29/27 405/36 |
| 11,230,836 B1 * | 1/2022 | Bandy | E03F 5/14 |
| 2004/0094471 A1 * | 5/2004 | Cole | B01D 29/27 210/460 |

* cited by examiner

360 — User provides a bag holding member, a fabric bag, a cap member, a first hook member and a second hook member, the bag holding member having a top portion, a bottom portion, an outer surface extending from the top portion to the bottom portion, and an inner surface extending from the top portion to the bottom portion, the inner surface defining a central open region; the fabric bag having a first end portion defining an open end; the cap member having a central opening

362 — User disposes the first end portion of the fabric bag through the central open region of the bag holding member, and further against the top portion and the outer surface of the bag holding member

364 — User disposes a portion of the fabric bag against a plurality of attachment tabs extending outwardly from the outer surface of the bag holding member

366 — User disposes the cap member against the first end portion of the fabric bag such that the first end portion is disposed between the cap member and the top portion of the bag holding member, the central opening of the cap member communicating with the open end of the fabric bag

368 — User couples a first hook member to the bag holding member

370 — User couples a second hook member to the bag holding member

FIG. 24

LINT CAPTURING ASSEMBLY

CROSS-REFERENCE TO RELATED APPLICATIONS

This application claims priority to U.S. Provisional Patent Application No. 63/223,612 filed on Jul. 20, 2021, the entire contents of which are hereby incorporated by reference herein.

BACKGROUND

Washing machines clean clothing and expel water having clothing lint therein. In some homes, the washing machine has a hose fluidly coupled to a laundry tub. During operation, the washing machine expels the water with the clothing lint therein into the laundry tub. A problem occurs when a drain hole in the laundry tub or a p-trap becomes clogged with the clothing lint and prevents the water from draining from the tub.

The inventor herein has recognized a need for a lint capturing assembly that minimizes or eliminates the above-mentioned problem.

SUMMARY

A lint capturing assembly in accordance with an exemplary embodiment is provided. The lint capturing assembly includes a bag holding member having a top portion, a bottom portion, an outer surface extending from the top portion to the bottom portion, and an inner surface extending from the top portion to the bottom portion. The inner surface defines a central open region. The lint capturing assembly further includes a fabric bag having a first end portion defining an open end. The first end portion is disposed through the central open region of the bag holding member. The first end portion is further disposed against the top portion and the outer surface of the bag holding member. The lint capturing assembly further includes a cap member that is disposed against the first end portion of the fabric bag such that the first end portion is disposed between the cap member and the top portion of the bag holding member. The cap member has a central opening that communicates with the open end of the fabric bag. The lint capturing assembly further includes a first hook member that is coupled to the bag holding member.

A method for assembling a lint capturing assembly in accordance with another exemplary embodiment is provided. The method includes providing a bag holding member, a fabric bag, a cap member, and a first hook member. The bag holding member has a top portion, a bottom portion, an outer surface extending from the top portion to the bottom portion, and an inner surface extending from the top portion to the bottom portion. The inner surface defines a central open region. The fabric bag has a first end portion that defines an open end. The cap member has a central opening. The method further includes disposing the first end portion of the fabric bag through the central open region of the bag holding member, and further against the top portion and the outer surface of the bag holding member. The method further includes disposing a portion of the fabric bag against a plurality of attachment tabs extending outwardly from the outer surface of the bag holding member. The method further includes disposing the cap member against the first end portion of the fabric bag such that the first end portion is disposed between the cap member and the top portion of the bag holding member. The central opening of the cap member communicates with the open end of the fabric bag. The method further includes coupling a first hook member to the bag holding member.

BRIEF DESCRIPTION OF THE DRAWINGS

FIG. 24 is a flowchart of a method for assembling the lint capturing assembly of FIG. 1 in accordance with an exemplary embodiment.

DETAILED DESCRIPTION

Figure 1:
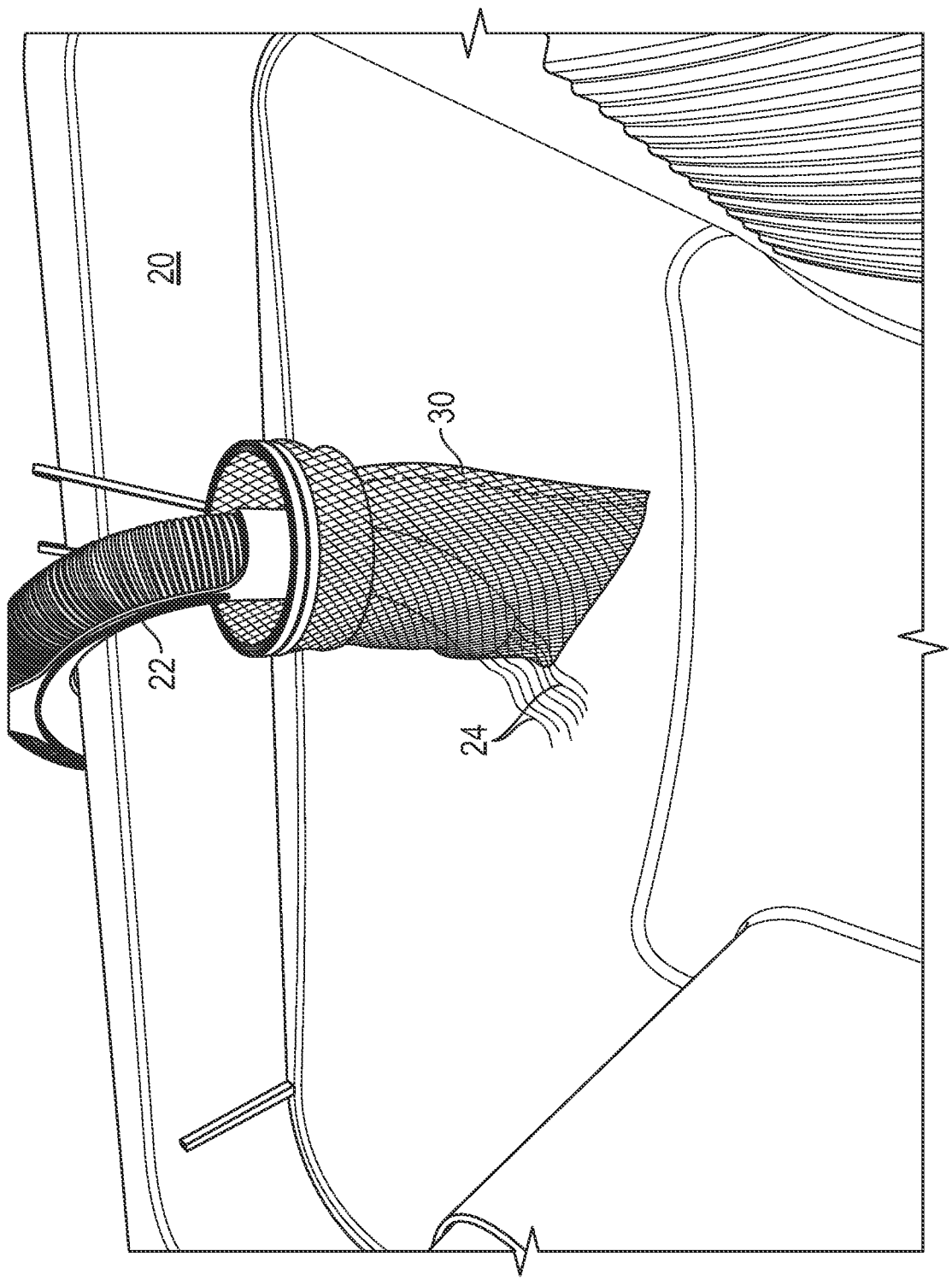
FIG. 1 is a schematic of a laundry tub, a washing machine hose, and a lint capturing assembly in accordance with an exemplary embodiment.

Referring to FIG. 1, a laundry tub 20 having a washing machine hose 22 disposed therein is illustrated. The washing machine hose 22 expels water 24 having clothing lint therein that flows into a lint capturing assembly 30 in accordance with an exemplary embodiment. The lint capturing assembly 30 captures the clothing lint in the received water and prevents the clothing lint from exiting the assembly 30 into the laundry tub 20.

Referring to FIGS. 1-6, the lint capturing assembly 30 is provided to be removably coupled to the laundry tub 20 and is sized and shaped to receive water from a washing machine hose 22. The lint capturing assembly 30 includes a bag holding member 60, a fabric bag 62, a cap member 64, first hook member 71, and a second hook member 72.

An advantage of the lint capturing assembly 30 is that the assembly 30 can be easily assembled and utilized. In particular, during assembly of the assembly 30, the fabric bag 62 is easily removably coupled to the bag holding member 64, and the cap member 64 and first and second hook member 71, 72 are easily removably coupled to the bag holding member 64. Further, during use, the fabric bag 62 can be easily removed from the lint capturing assembly 30 by removing the cap member 64 from the bag holding member 60, and then de-coupling the fabric bag 62 from the attachment tabs 110-122 on the bag holding member 64. Further, the fabric bag 62 can be easily cleaned while on the bag holding member 64 by pulling the fabric bag 62 through the central open region 160 of the bag holding member 60 and then removing the clothing lint from the fabric bag 62. Thereafter, the fabric bag 62 is pushed back through the central open region 160 of the bag holding member 60 to its original operational position.

Referring to FIGS. 2 and 7-12, the bag holding member 60 is provided to hold the fabric bag 62 thereon. The bag holding member 60 includes a tubular portion 100, an extension portion 102, and attachment tabs 110, 112, 114, 116, 118, 120, 122. In an exemplary embodiment, the bag holding member 60 is constructed of plastic.

The tubular portion 100 includes a top portion 150 a bottom portion 152, an inner surface 154, and an outer surface 156. The inner surface 154 defines a central open region 160 (shown in FIG. 11). The outer surface 156 extends from the top portion 150 to the bottom portion 152. Also, the inner surface 154 extends from the top portion 150 to the bottom portion 152.

Figure 2:
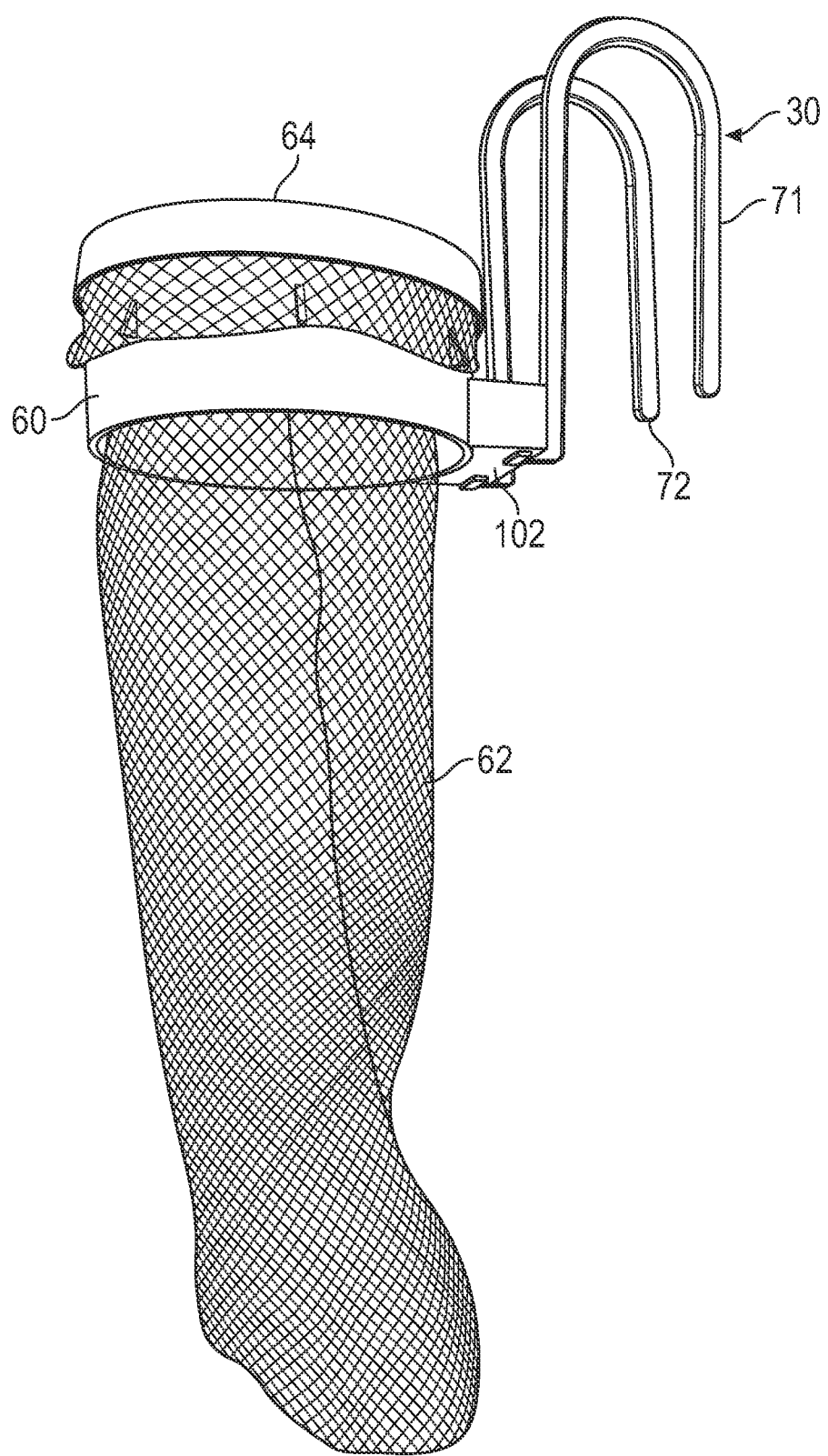
FIG. 2 is an isometric view of the lint capturing assembly of FIG. 1.
Figure 3:
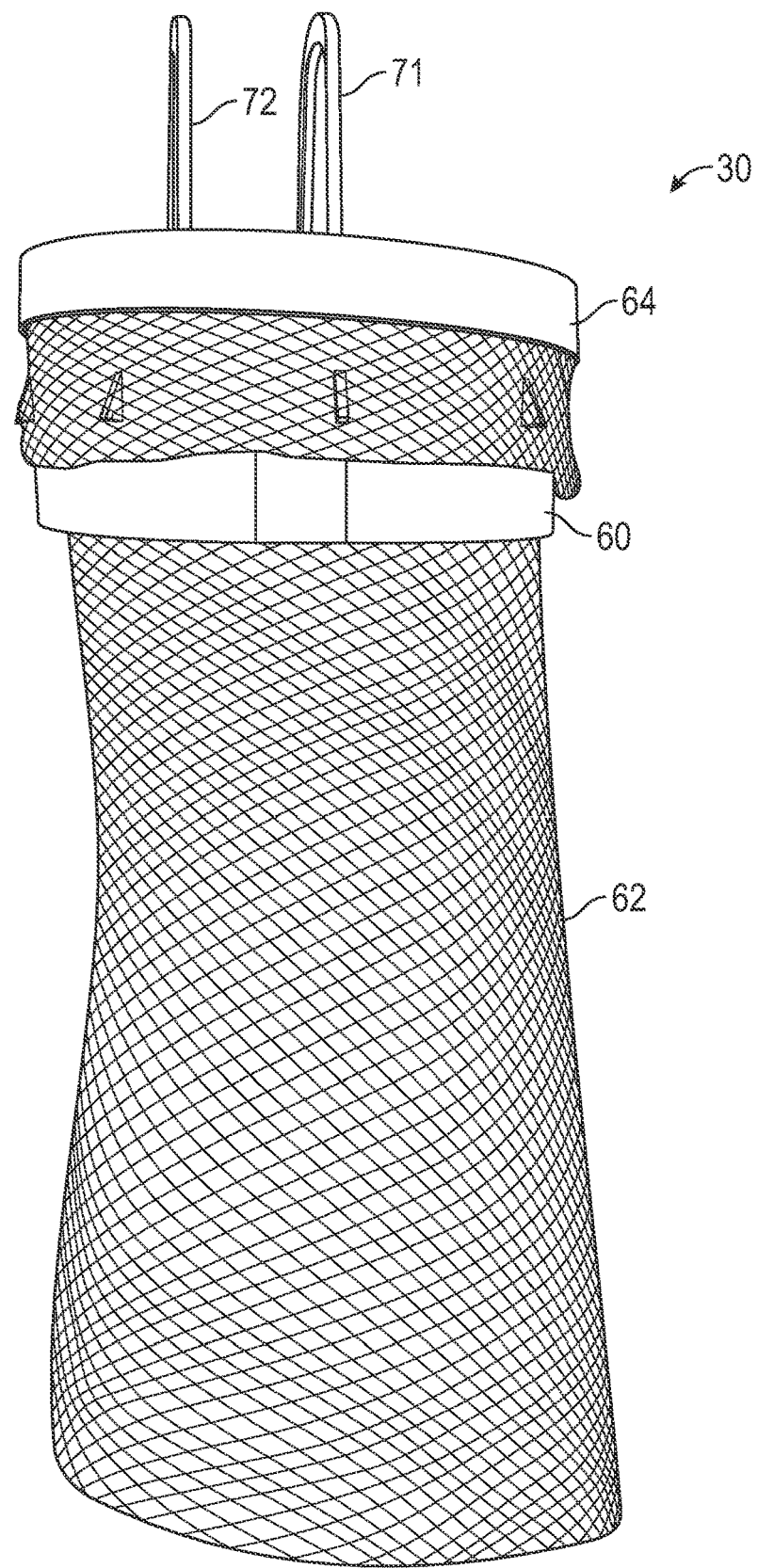
FIG. 3 is a front view of the lint capturing assembly of FIG. 1.
Figure 4:
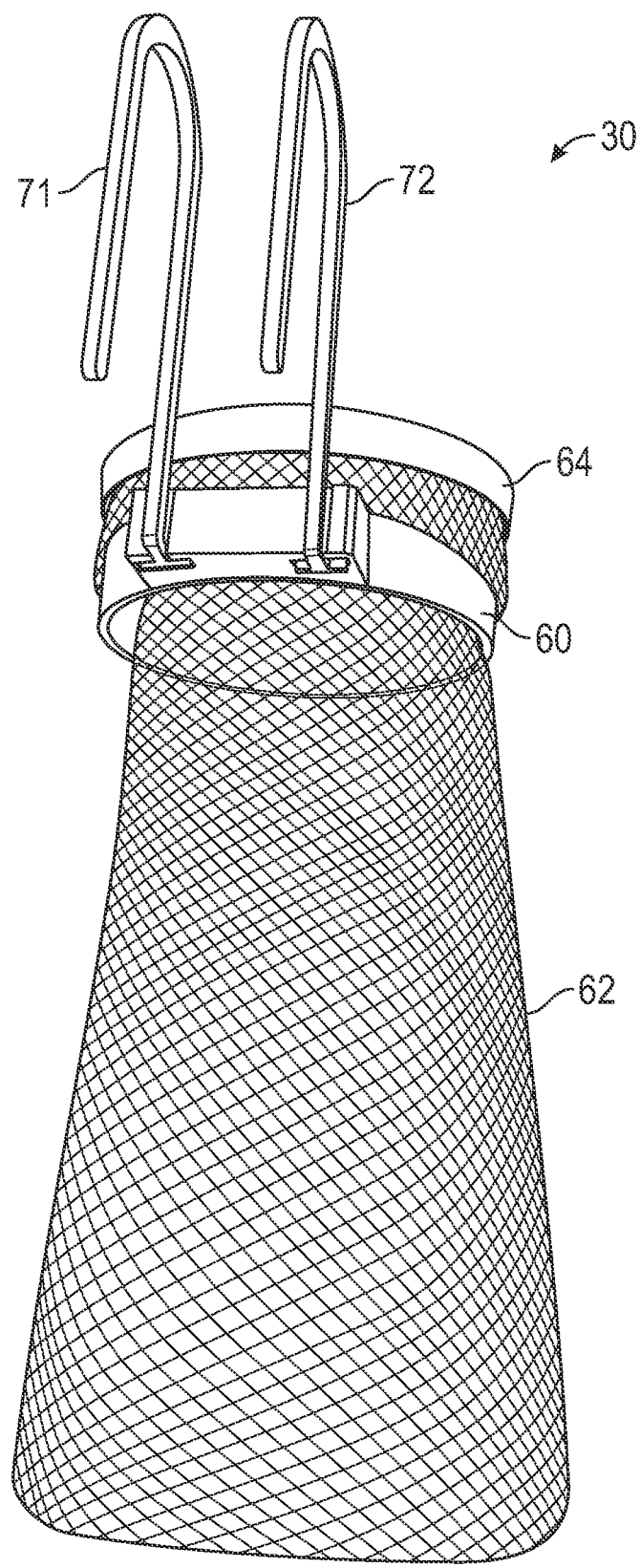
FIG. 4 is a rear view of the lint capturing assembly of FIG. 1.
Figure 5:
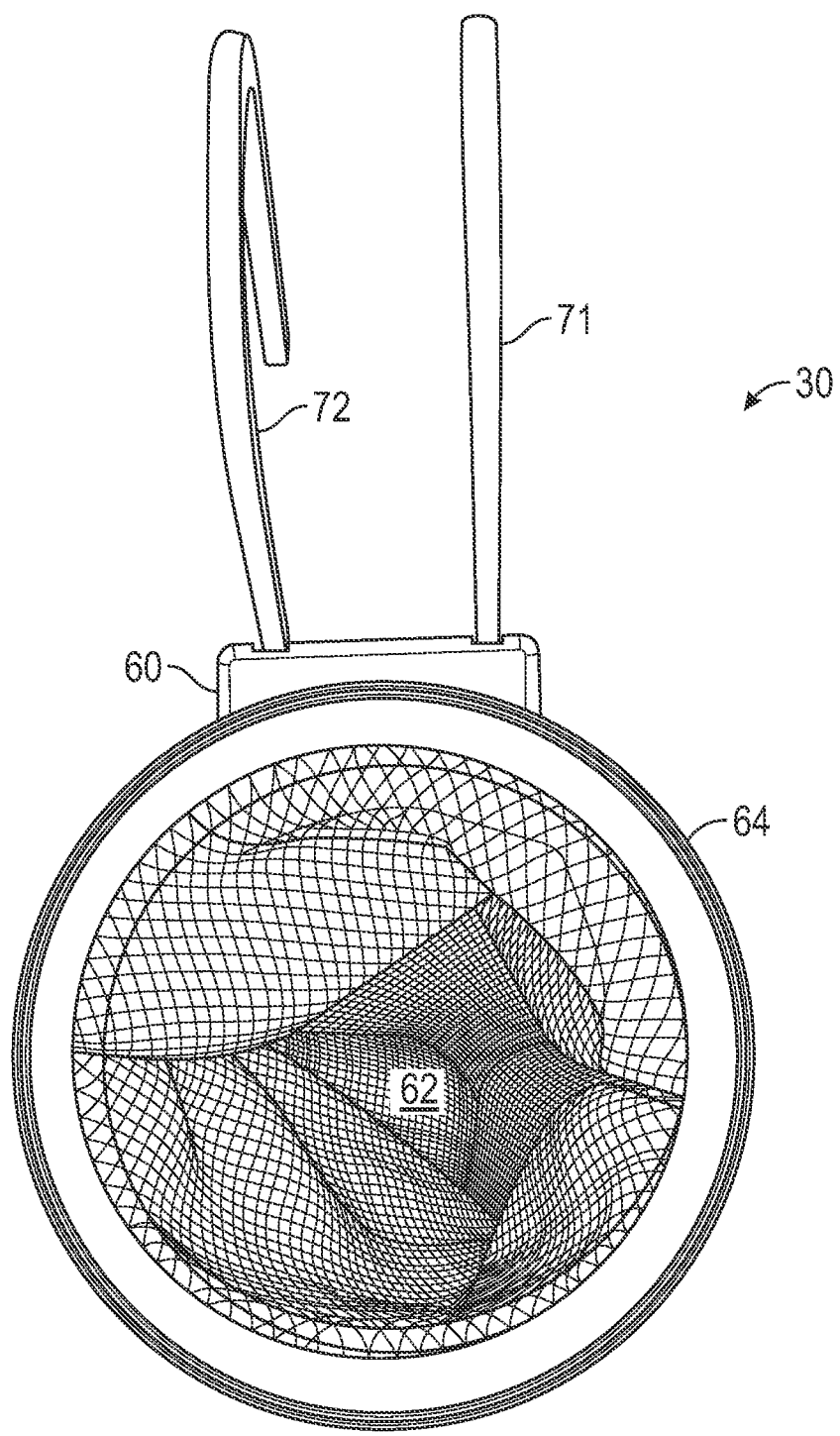
FIG. 5 is a top view of the lint capturing assembly of FIG. 1.
Figure 12:
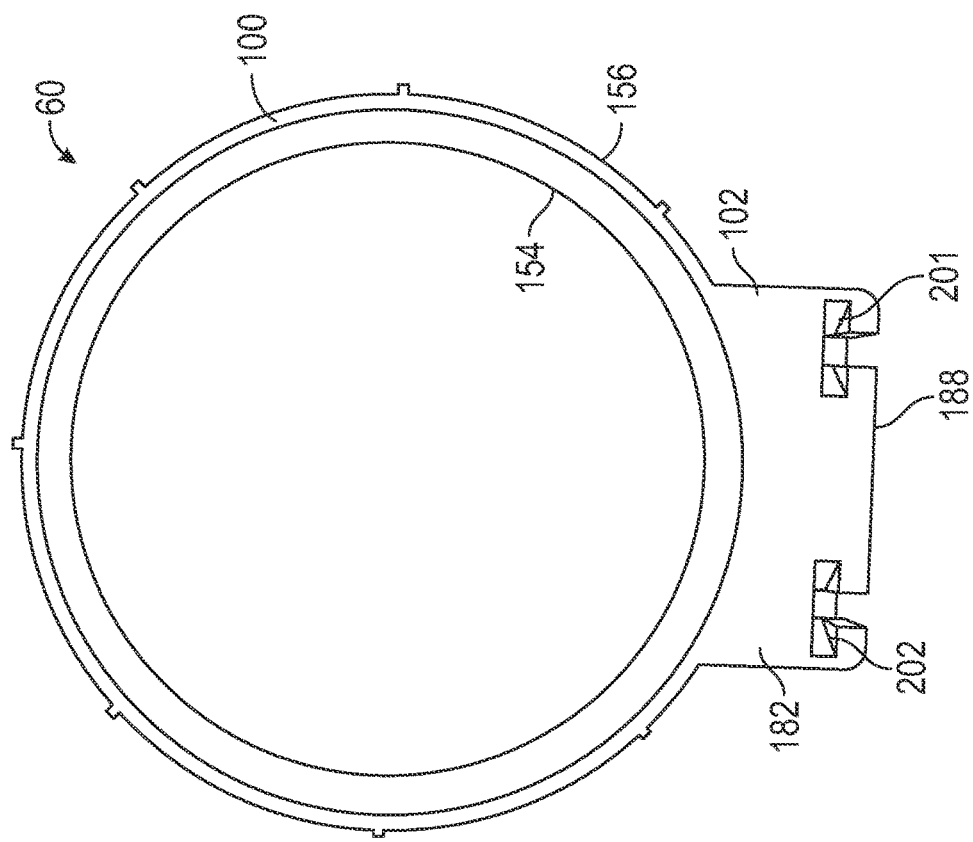
FIG. 12 is a bottom view of the bag holding member of FIG. 7.
Figure 11:
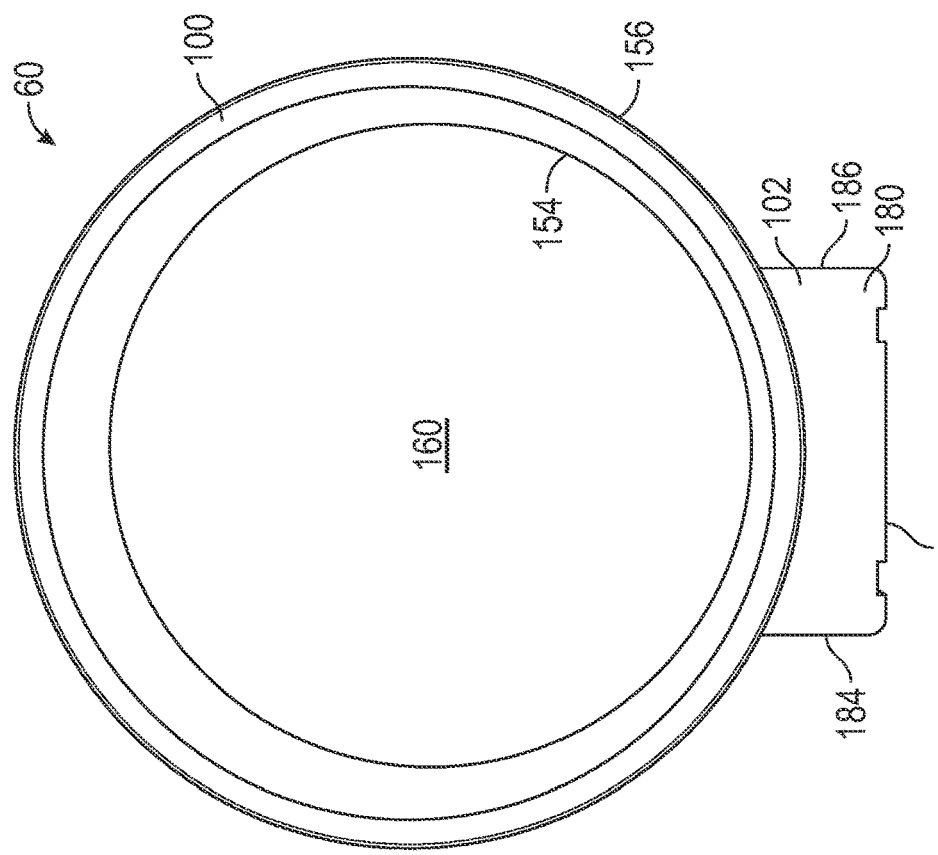
FIG. 11 is a top view of the bag holding member of FIG. 7.

Referring to FIGS. 2, 11 and 12, the extension portion 102 is provided to removably hold the first and second hook members 71, 72 thereon. The extension portion 102 is coupled to the outer surface 156 and extends outwardly from the outer surface 156. The extension portion 102 includes a top surface 180, a bottom surface 182, a side surface 184, a side surface 186, a rear surface 188, a first wedge-shaped groove 201, and a second wedge-shaped groove 202. The top surface 180 and the bottom surface 182 are disposed substantially parallel to one another. Also, the side surfaces 184, 186 are also disposed substantially parallel to one another and extend between the top surface 180 and the bottom surface 182. The rear surface 188 extends substantially perpendicular to the top surface 180 and extends between the top surface 180 and the bottom surface 182, and further between the side surfaces 184, 186.

Figure 18:
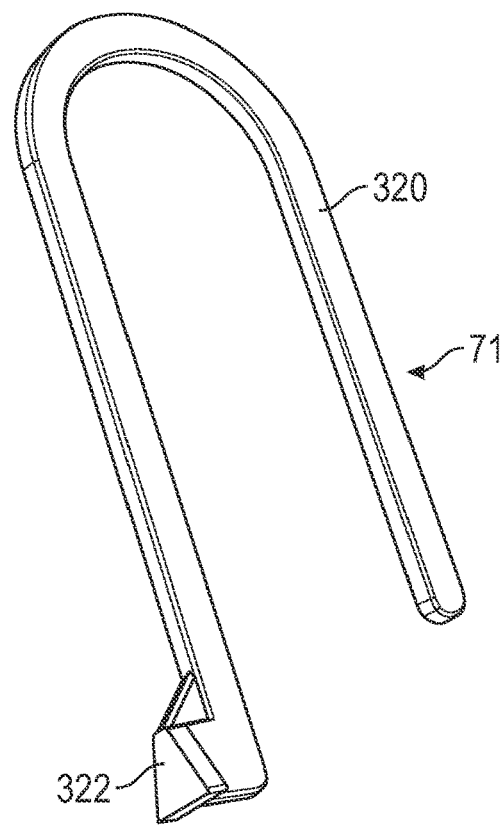
FIG. 18 is an isometric view of a first hook member utilized in the lint capturing assembly of FIG. 1.
Figure 19:
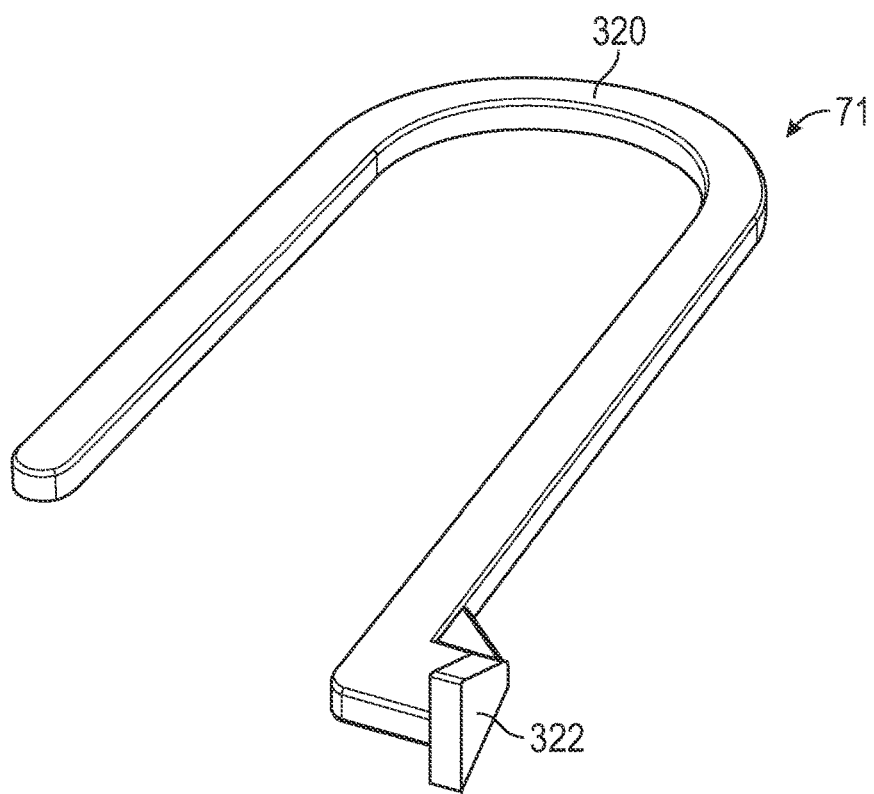
FIG. 19 is another isometric view of the first hook member of FIG. 18.
Figure 20:
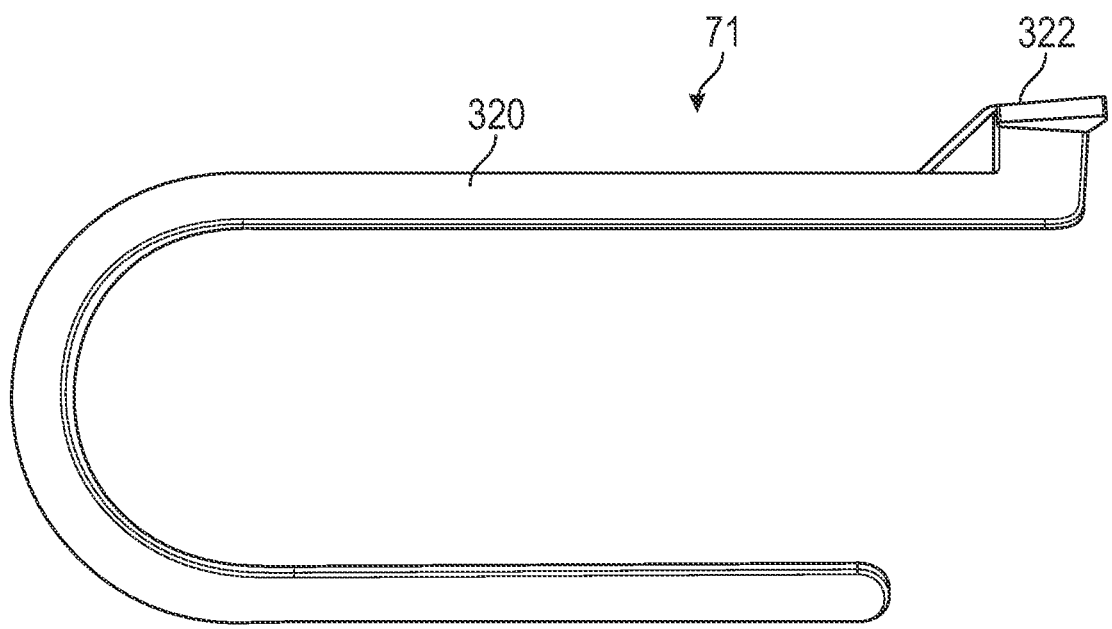
FIG. 20 is a side view of the first hook member of FIG. 18.

Referring to FIGS. 2, 12 and 18, the first wedge-shaped groove 201 extends from the bottom surface 182 into the extension portion 102. The first wedge-shaped groove 201 is sized and shaped to receive a wedge-shaped end portion 322 of the first hook member 71 (shown in FIG. 18) therein to removably couple the first hook member 71 to the extension portion 102.

Figure 21:
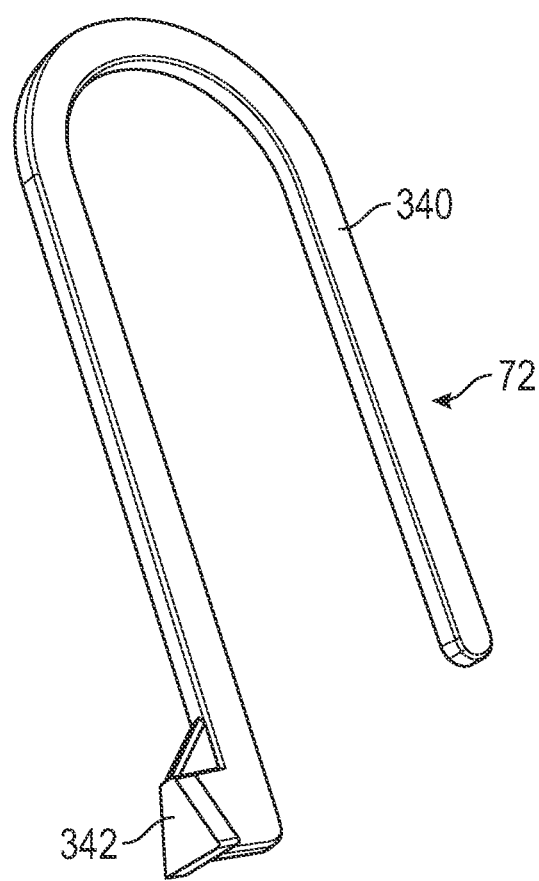
FIG. 21 is an isometric view of a second hook member utilized in the lint capturing assembly of FIG. 1.
Figure 22:
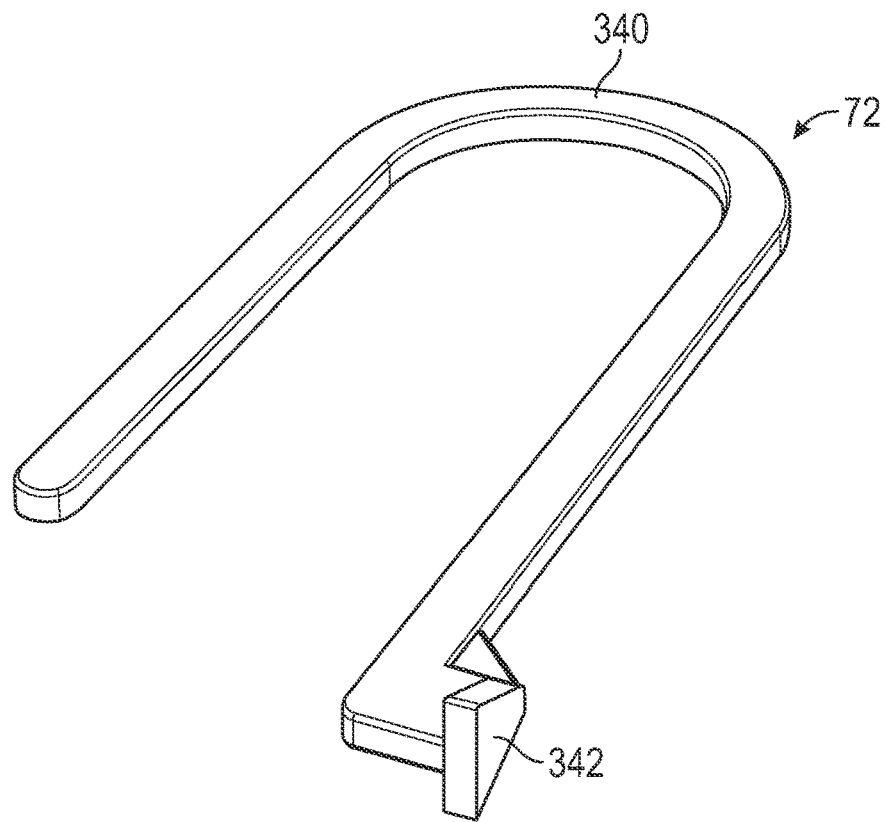
FIG. 22 is another isometric view of the second hook member of FIG. 21.
Figure 23:
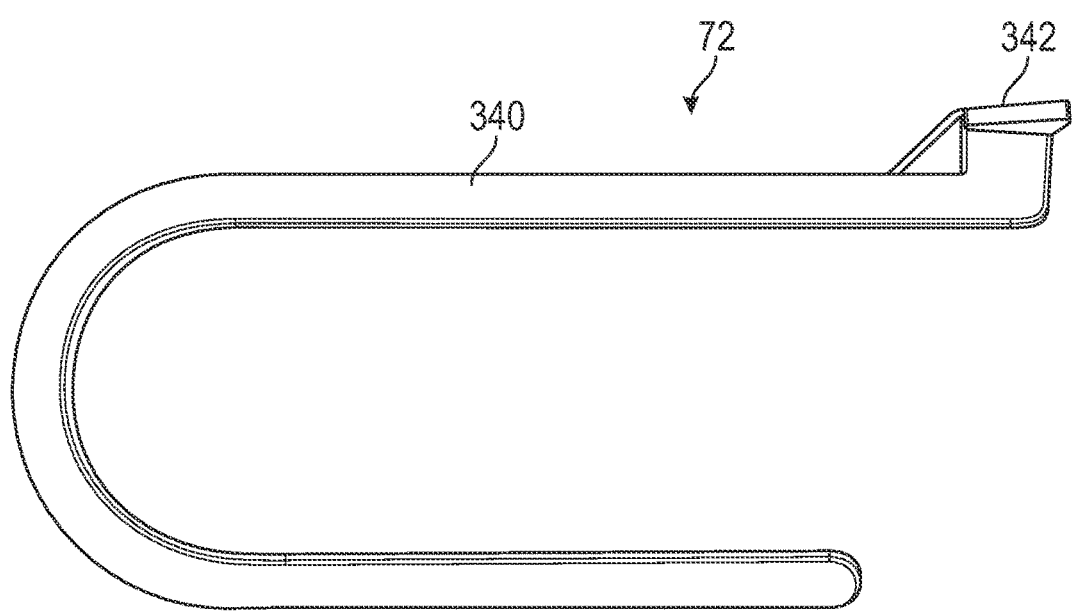
FIG. 23 is a side view of the second hook member of FIG. 21.

Referring to FIGS. 2, 12 and 21, the second wedge-shaped groove 202 extends from the bottom surface 182 into the extension portion 102. The second wedge-shaped groove 202 is sized and shaped to removably receive a wedge-shaped end portion 342 of the second hook member 72 (shown in FIG. 21) therein to removably couple the second hook member 72 to the extension portion 102.

Referring to FIGS. 2 and 7-10, the attachment tabs 110-122 are provided to removably hold the fabric bag 62 on the bag holding member 60. The attachment tabs 110-122 are coupled to and extend outwardly from the outer surface 156 of the bag holding member 60. The attachment tabs 110-122 are disposed apart from one another and around the periphery of the tubular portion 100 of the bag holding member 60. Further, the attachment tabs 110-122 are disposed above the extension portion 102.

Figure 6:
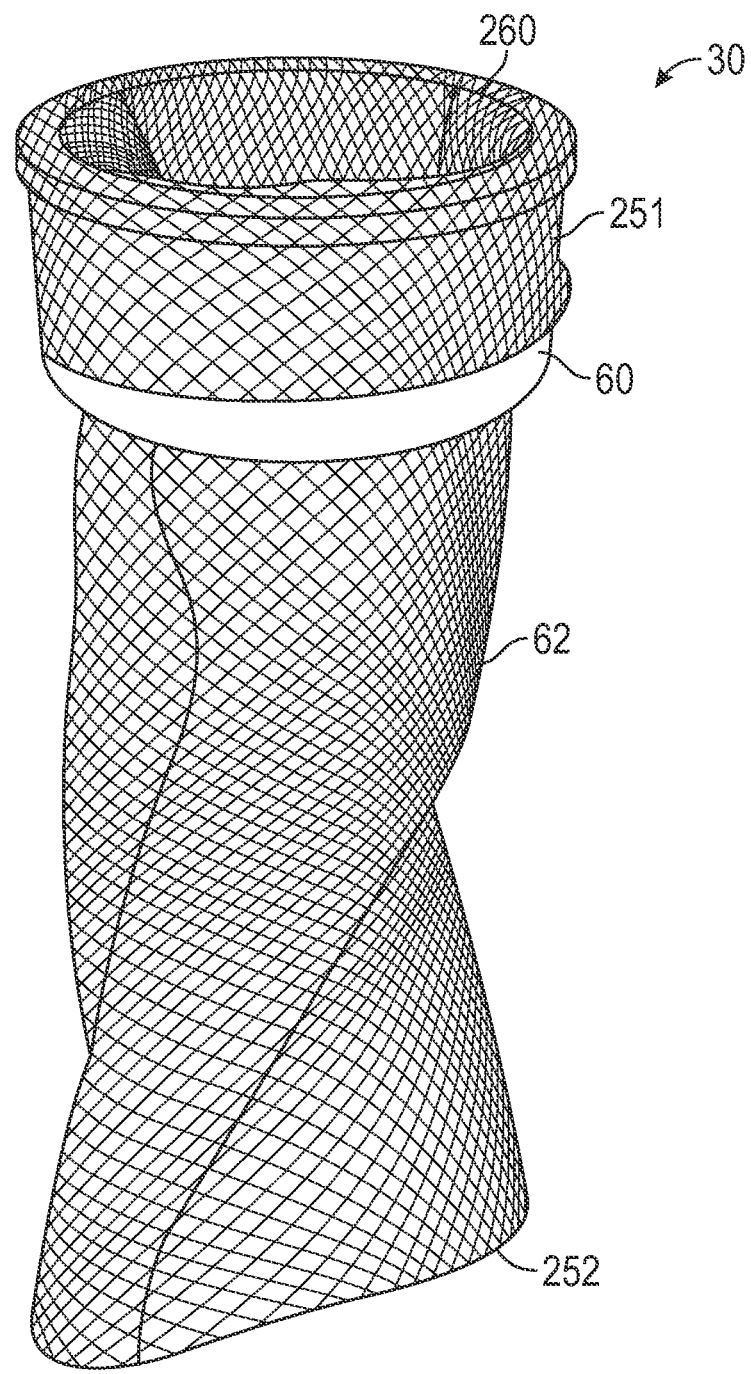
FIG. 6 is a side view of a bag holding member and a fabric bag utilized in the lint capturing assembly of FIG. 1.
Figure 7:
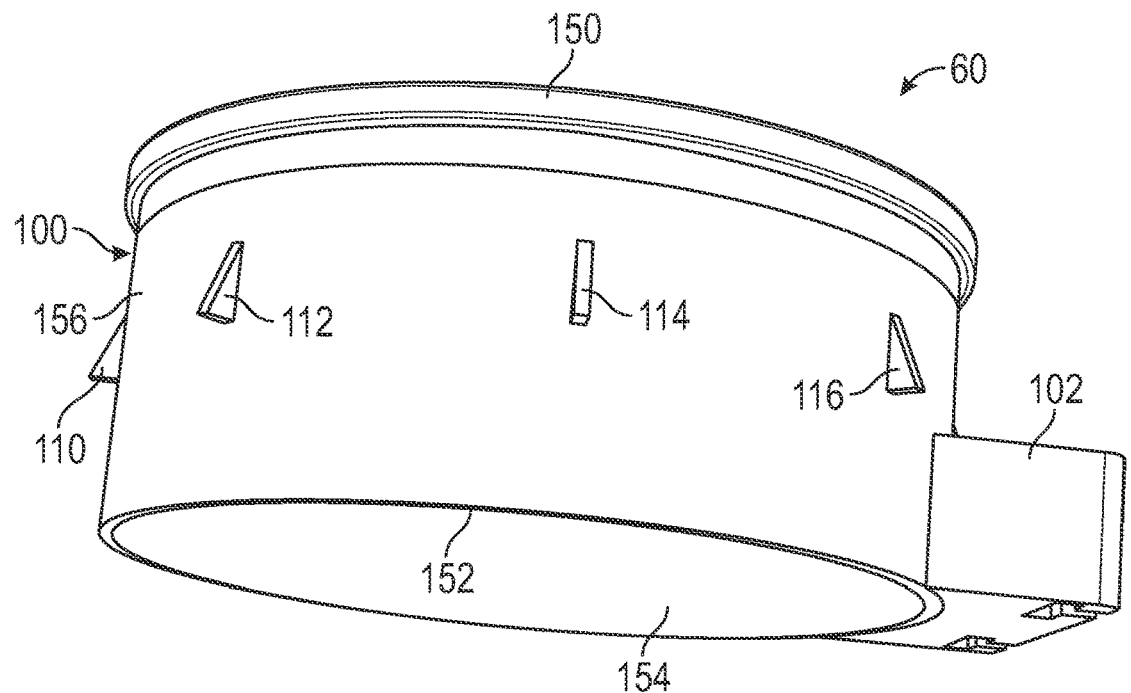
FIG. 7 is an isometric view of a bag holding member utilized in the lint capturing assembly of FIG. 1.
Figure 8:
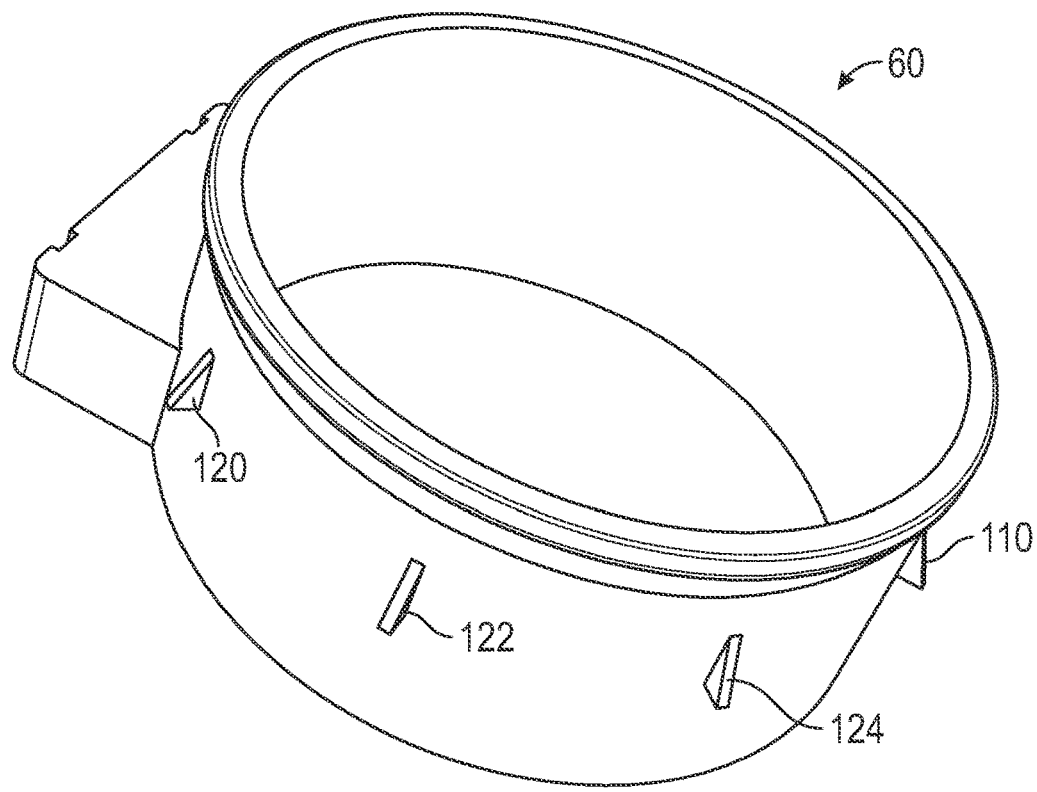
FIG. 8 is another isometric view of the bag holding member of FIG. 7.
Figure 9:
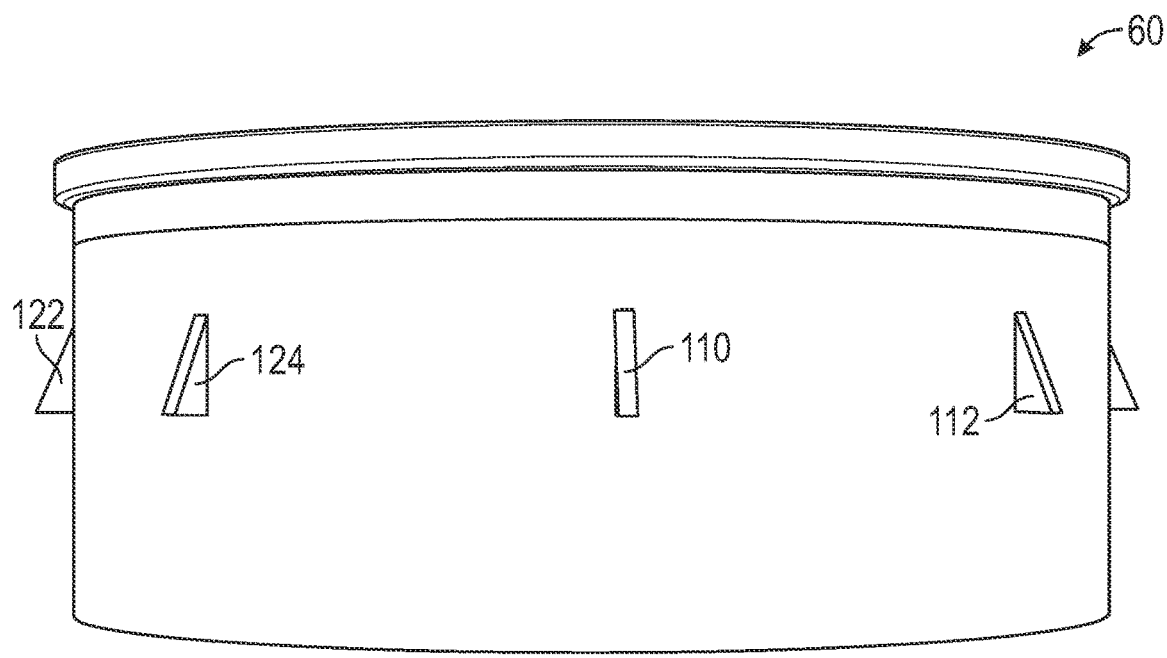
FIG. 9 is a front view of the bag holding member of FIG. 7.
Figure 10:
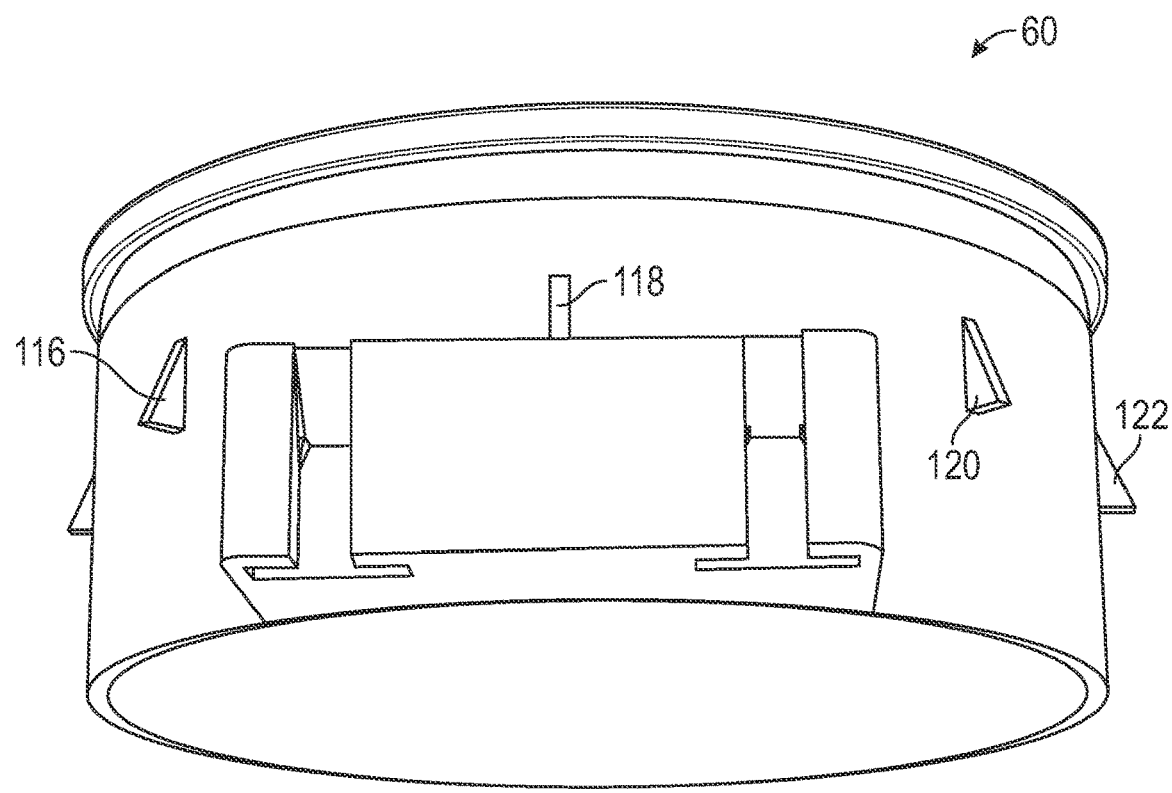
FIG. 10 is a rear view of the bag holding member of FIG. 7.
Figure 13:
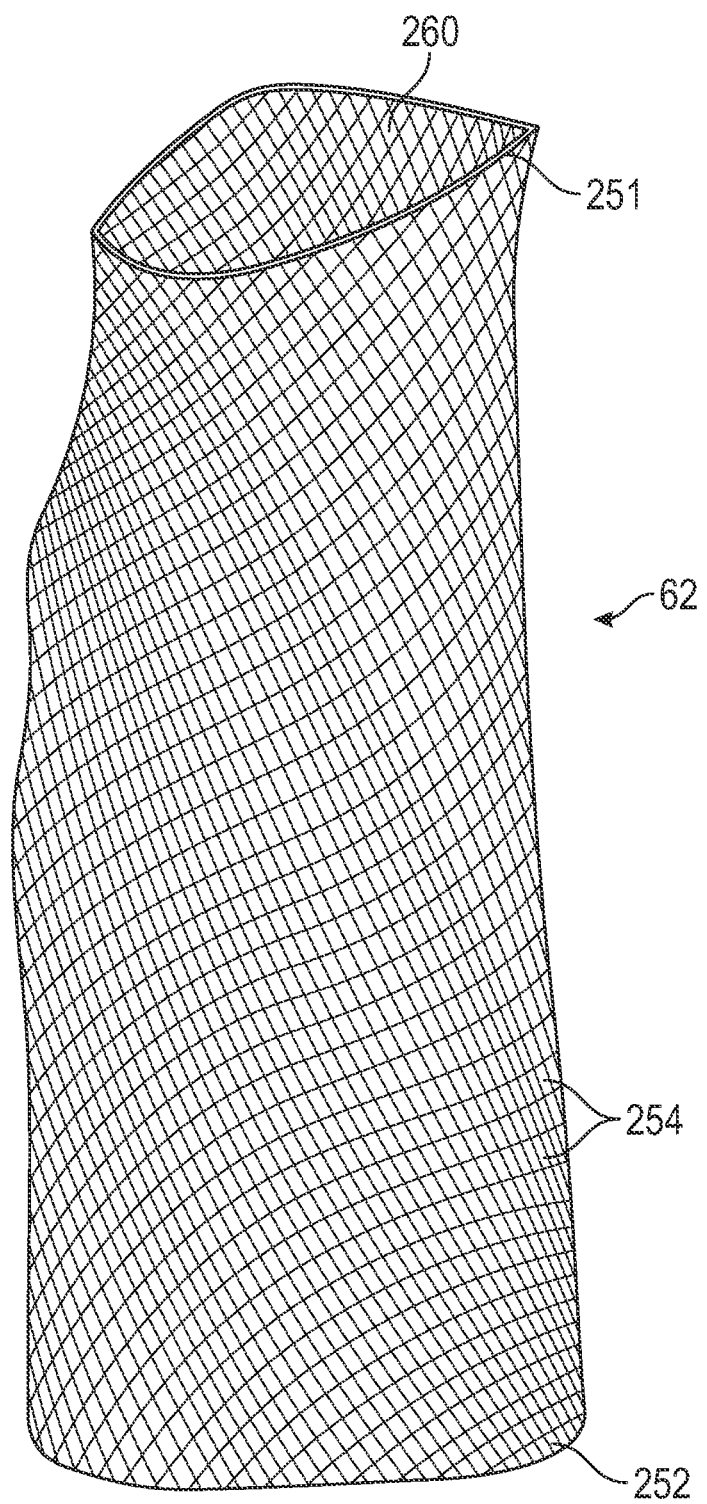
FIG. 13 is a fabric bag utilized in the lint capturing assembly of FIG. 1.
Figure 14:
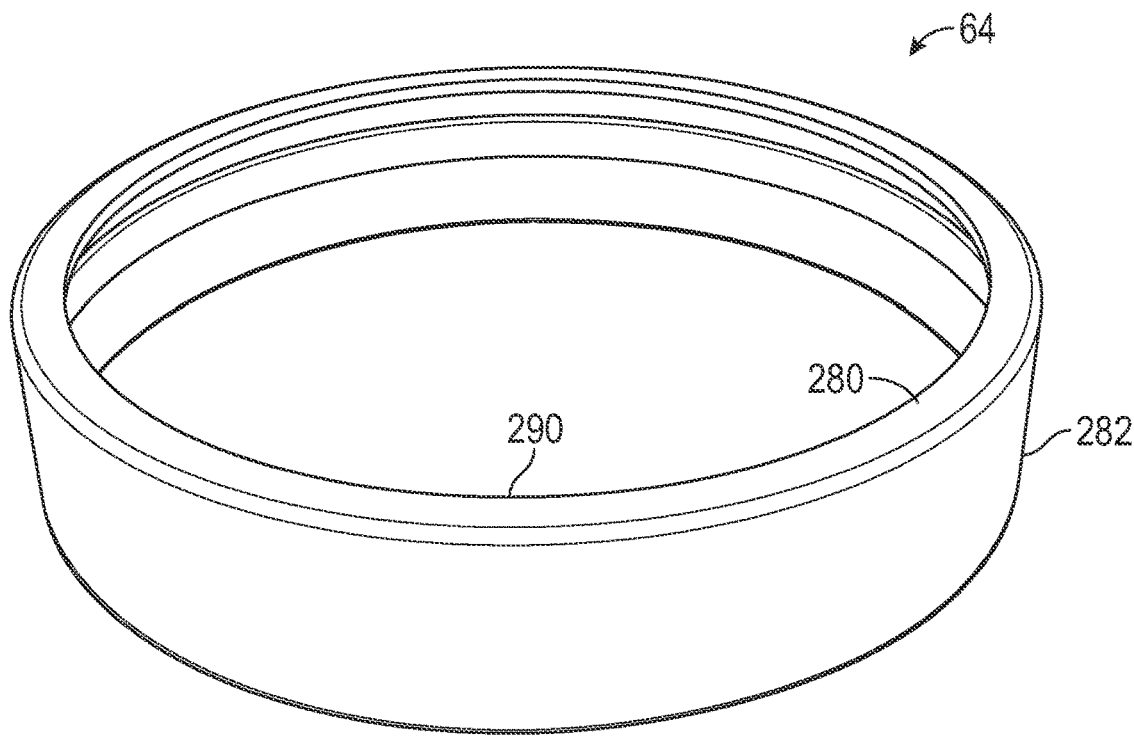
FIG. 14 is an isometric view of a cap member utilized in the lint capturing assembly of FIG. 1.
Figure 15:
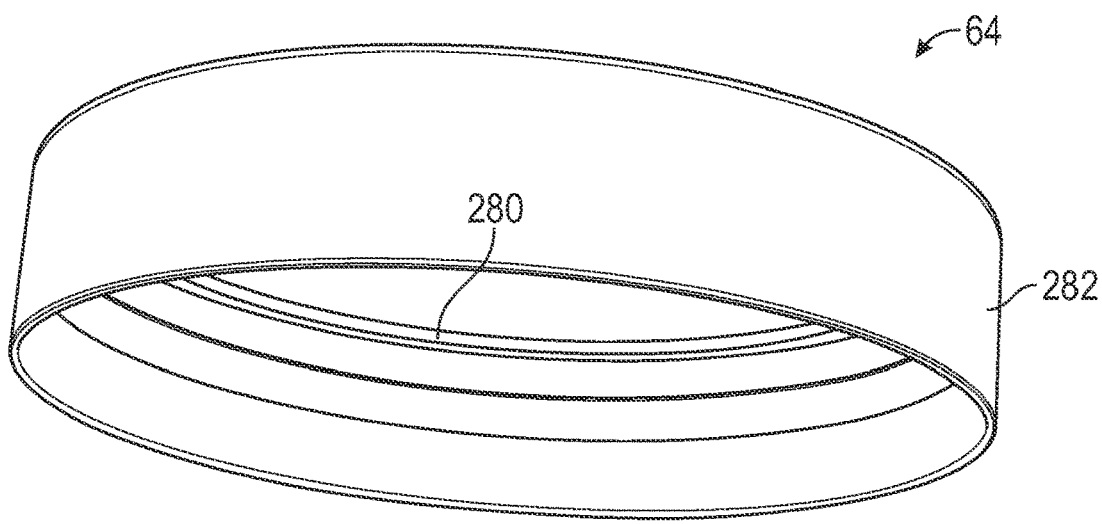
FIG. 15 is another isometric view of the cap member of FIG. 14.
Figure 16:
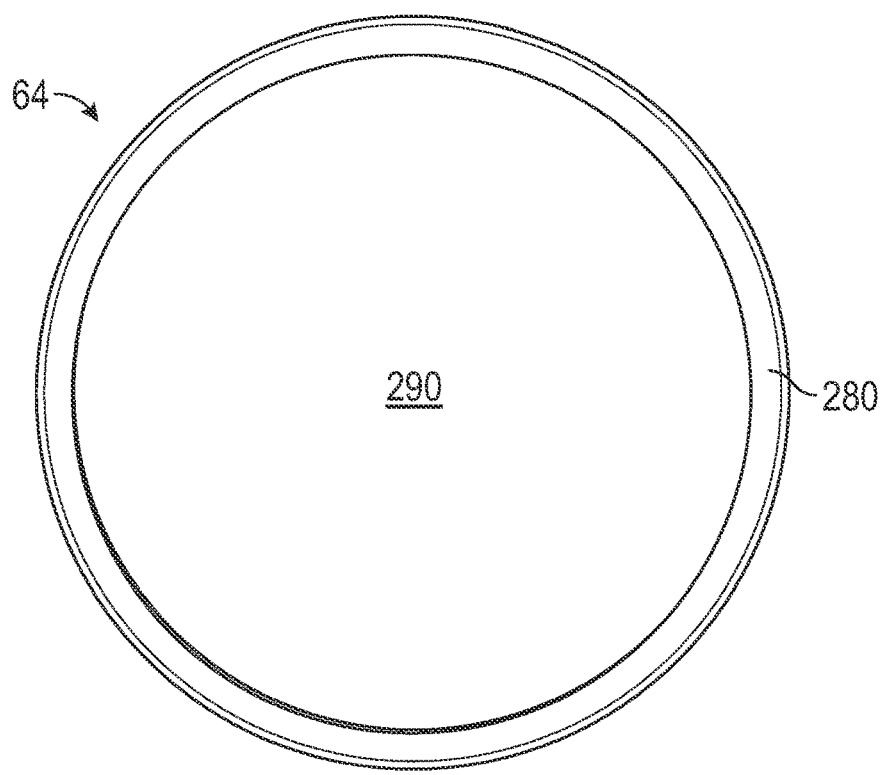
FIG. 16 is a top view of the cap member of FIG. 14.
Figure 17:
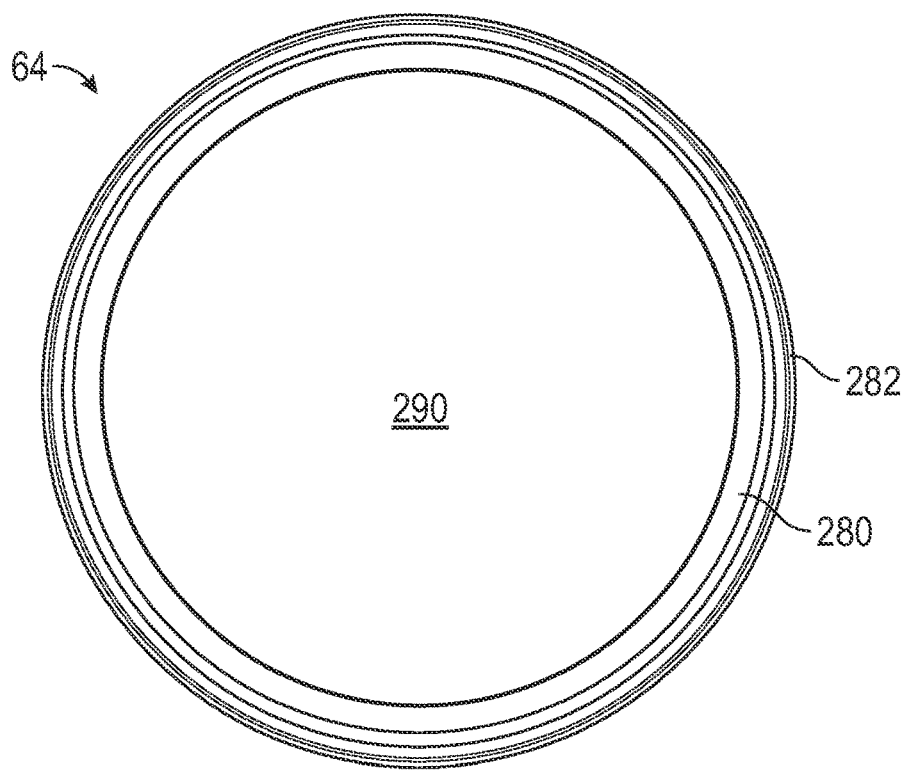
FIG. 17 is a bottom view of the cap member of FIG. 14.

Referring to FIGS. 6 and 13, the fabric bag 62 is provided to capture clothing lint therein. The fabric bag 62 includes a first end portion 251, a second end portion 252, and a plurality of apertures 254 extending therethrough. The first end portion 251 defines an open end 260. The plurality of apertures 254 are sized and shaped to allow water 24 from the washing machine hose 22 to pass therethrough while preventing clothing lint from passing therethrough. In an exemplary embodiment, the fabric bag 62 is constructed of a plastic polymer such as nylon for example. During assembly of the lint capturing assembly 30, the fabric bag 62 is disposed through the central open region 160 (shown in FIG. 11) of the bag holding member 60. Further, the first end portion 251 is disposed against the top portion 150 (shown in FIG. 7) and the outer surface 156 of the tubular portion 100 of the bag holding member 60. Further, the first end portion 251 is removably attached to the attachment tabs 110-122 to removably hold the fabric bag 62 on the bag holding member 60.

Referring to FIGS. 5, 7 and 14-17, the cap member 64 is provided to hold the fabric bag 62 on the top portion 150 of the tubular portion 100 of the bag holding member 60. The cap member 64 includes a top ring-shaped portion 280 and a tubular portion 282. The tubular portion 282 is coupled to the top ring-shaped portion 280 and extends perpendicular to the top ring-shaped portion 280. The top ring-shaped portion 280 defines the central opening 290. Further, an inner diameter of the tubular portion 282 of the cap member 64 is greater than or equal to an outer diameter of the top portion 150 of the tubular portion 100 of the bag holding member 60. In an exemplary embodiment, the cap member 64 is constructed of plastic. During assembly of the lint capturing assembly 30, and after the fabric bag 62 is disposed on the bag holding member 60, the cap member 64 is disposed against the first end portion 251 of the fabric bag 62 such that the first end portion 251 is disposed between the cap member 64 and the top portion 150 of the tubular portion 100 of the bag holding member 60. Further, the central opening 290 (shown in FIG. 11) of the cap member 64 communicates with the open end 260 (shown in FIG. 6) of the fabric bag 62.

Referring to FIGS. 1 and 18-20, the first hook member 71 is provided to hold the bag holding member 60 on the laundry tub 20. The first hook member 71 has a substantially U-shaped portion 320 and a wedge-shaped end portion 322. The wedge-shaped end portion 322 is integrally formed to an end of the substantially U-shaped portion 320. The substantially U-shaped portion 320 is sized and shaped to be received and held on a wall of the laundry tub 20 (shown in FIG. 1). During assembly of the lint capturing assembly 30, the wedge-shaped end portion 322 is disposed within the first wedge-shaped groove 201 (shown in FIG. 12) in the extension portion 102 to removably couple the first hook member 71 to the extension portion 102.

Referring to FIGS. 1 and 21-23, the second hook member 72 is provided to hold the bag holding member 60 on the laundry tub 20. The second hook member 72 has a substantially U-shaped portion 340 and a wedge-shaped end portion 342. The wedge-shaped end portion 342 is integrally formed to an end of the substantially U-shaped portion 340. The substantially U-shaped portion 340 is sized and shaped to be received and held on a wall of the laundry tub 20 (shown in FIG. 1). During assembly of the lint capturing assembly 30, the wedge-shaped end portion 342 is disposed within the second wedge-shaped groove 202 (shown in FIG. 12) in the extension portion 102 to removably couple the second hook member 72 to the extension portion 102.

Referring to FIGS. 1-12 and 24, a flowchart of a method for assembling the lint capturing assembly 30 will now be described.

At step 360, a user provides a bag holding member 60, a fabric bag 62, a cap member 64, a first hook member 71, and a second hook member 72. The bag holding member 60 having a top portion 150, a bottom portion 152, an outer surface 156 extending from the top portion 150 to the bottom portion 152, and an inner surface 154 extending from the top portion 150 to the bottom portion 152. The inner surface 154 defines a central open region 160. The fabric bag 62 has a first end portion 251 defines an open end 260. The cap member 64 has a central opening 290.

At step 362, the user disposes the first end portion 251 of the fabric bag 62 through the central open region 160 of the bag holding member 60, and further against the top portion 150 and the outer surface 156 of the bag holding member 60.

At step 364, the user disposes a portion of the fabric bag 62 against a plurality of attachment tabs (e.g., attachment tabs 110-120) extending outwardly from the outer surface 156 of the bag holding member 60.

At step 366, the user disposes the cap member 64 against the first end portion 251 of the fabric bag 62 such that the first end portion 251 is disposed between the cap member 64 and the top portion 150 of the bag holding member 60. The central opening 290 of the cap member 64 communicates with the open end 260 of the fabric bag 62.

At step 368, the user couples a first hook member 71 to the bag holding member 60.

At step 370, the user couples a second hook member 72 to the bag holding member 60.

The lint capturing assembly 30 provides a substantial advantage over other methods. In particular, during assembly of the assembly 30, the fabric bag 62 is easily removably coupled to the bag holding member 64, and the cap member 64 and first and second hook member 71, 72 are easily removably coupled to the bag holding member 64. Further, during use, the fabric bag 62 can be easily removed from the lint capturing assembly 30 by removing the cap member 64 from the bag holding member 64, and then de-coupling the fabric bag 62 from the attachment tabs 110-122 on the bag holding member 64. Further, the fabric bag 62 can be easily cleaned while on the bag holding member 60 by pulling the fabric bag 62 through the central open region 160 of the bag holding member 60 and then removing the clothing lint from the fabric bag 62. Thereafter, the fabric bag 62 is pushed back through the central open region 160 of the bag holding member 60 to its original operational position.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A lint capturing assembly, comprising:
a bag holding member having a tubular portion, an extension portion, and first, second, and third attachment tabs: the tubular portion having a top portion, a bottom portion, an outer surface extending from the top portion to the bottom portion, and an inner surface extending from the top portion to the bottom portion, the inner surface defining a central open region; the first, second, and third attachment tabs being coupled to the outer surface and extending outwardly from the outer surface; the extension portion being coupled to the outer surface below the first, second, and third attachment tabs, the extension portion extending outwardly from the outer surface; the extension portion having a bottom surface and a first wedge-shaped groove that extends from the bottom surface upwardly into the extension portion;
a fabric bag having a first end portion defining an open end, the first end portion being disposed through the central open region of the bag holding member from the bottom portion to the top portion of the tubular portion and then disposed over and against the top portion of the tubular portion and further disposed against the outer surface of the tubular portion such that the fabric bag is removably coupled to the first, second, and third attachment tabs;
a cap member being disposed against the first end portion of the fabric bag such that the first end portion is disposed between the cap member and the top portion of the tubular portion of the bag holding member, the cap member having a central opening that communicates with the open end of the fabric bag; and
a first hook member having a wedge-shaped end portion that is received in the first wedge-shaped groove to removably couple the first hook member to the extension portion.

2. The lint capturing assembly of claim 1, wherein:
the extension portion further having a second wedge-shaped groove that extends from the bottom surface into the extension portion; and
a second hook member having a wedge-shaped end portion that is received in the second wedge-shaped groove to removably couple the second hook member to the extension portion.

3. The lint capturing assembly of claim 1, wherein:
the first hook member having a substantially U-shaped portion and the wedge-shaped end portion, the wedge-shaped end portion being integrally formed to an end of the substantially U-shaped portion.

4. The lint capturing assembly of claim 1, wherein:
the cap member having a top ring-shaped portion and a tubular portion, the tubular portion of the cap member being coupled to the top ring-shaped portion and extending perpendicular to the top ring-shaped portion, the top ring-shaped portion defining the central opening.

5. The lint capturing assembly of claim 4, wherein:
an inner diameter of the tubular portion of the cap member being greater than or equal to an outer diameter of the top portion of the bag holding member.

6. The lint capturing assembly of claim 1, wherein:
each of the first, second, and third attachment tabs are triangular-shaped.

7. A lint capturing assembly, comprising:
a bag holding member having a tubular portion, an extension portion, and first, second, and third attachment tabs; the tubular portion having a top portion, a bottom portion, an outer surface extending from the top portion to the bottom portion, and an inner surface extending from the top portion to the bottom portion, the inner surface defining a central open region; the first, second, and third attachment tabs being coupled to the outer surface and extending outwardly from the outer surface; the extension portion being coupled to the outer surface below the first, second, and third attachment tabs, the extension portion extending outwardly from the outer surface; the tubular portion having a longitudinal length from the bottom portion to the top portion that is greater than a longitudinal length of the extension portion;
a fabric bag having a first end portion defining an open end, the first end portion being disposed through the central open region of the bag holding member from the bottom portion to the top portion of the tubular portion and then disposed over and against the top portion of the tubular portion and further disposed against the outer surface of the tubular portion such that the fabric bag is removably coupled to the first, second, and third attachment tabs;
a cap member being disposed against the first end portion of the fabric bag such that the first end portion is disposed between the cap member and the top portion of the tubular portion of the bag holding member, the cap member having a central opening that communicates with the open end of the fabric bag; and
first and second hooks members being removably coupled to the extension portion.

8. The lint capturing assembly of claim 7, wherein:
each of the first, second, and third attachment tabs are triangular-shaped.

9. A method for assembling a lint capturing assembly, comprising:
providing a bag holding member having a tubular portion, an extension portion, and first, second, and third attachment tabs; the tubular portion having a top portion, a bottom portion, an outer surface extending from the top portion to the bottom portion, and an inner surface extending from the top portion to the bottom portion, the inner surface defining a central open region; the first, second, and third attachment tabs being coupled to the outer surface and extending outwardly from the outer surface; the extension portion being coupled to the outer surface below the first, second, and third attachment tabs, the extension portion extending outwardly from the outer surface; the extension portion having a bottom surface and a first wedge-shaped groove that extends from the bottom surface upwardly into the extension portion;
disposing a first end portion of a fabric bag through the central open region of the bag holding member from the bottom portion to the top portion of the tubular portion and then over and against the top portion of the tubular portion, and further disposed against the outer surface of the tubular portion such that the fabric bag is removably coupled to the first, second, and third attachment tabs;
disposing a cap member against the first end portion of the fabric bag such that the first end portion is disposed between the cap member and the top portion of the tubular portion of the bag holding member, the central opening of the cap member communicating with the open end of the fabric bag; and
disposing a wedge-shaped end portion of a first hook member in the first wedge-shaped groove to removably couple the first hook member to the extension portion.

10. The method of claim 9, wherein:
the extension portion further having a second wedge-shaped groove that extends from the bottom surface into the extension portion; the method further comprising:
disposing a wedge-shaped end portion of a second hook member in the second wedge-shaped groove to removably couple the second hook member to the extension portion.

* * * * *